United States Patent
Birukov et al.

(10) Patent No.: US 11,282,083 B2
(45) Date of Patent: *Mar. 22, 2022

(54) SYSTEMS AND METHODS FOR DETECTING TRANSACTION CARD FRAUD BASED ON GEOGRAPHIC PATTERNS OF PURCHASES

(71) Applicant: MASTERCARD INTERNATIONAL INCORPORATED, Purchase, NY (US)

(72) Inventors: Andrey Birukov, Scarsdale, NY (US); Jean-Pierre Gerard, Croton-On-Hudson, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 193 days.

This patent is subject to a terminal disclaimer.

(21) Appl. No.: 16/049,610

(22) Filed: Jul. 30, 2018

(65) Prior Publication Data

US 2018/0336565 A1 Nov. 22, 2018

Related U.S. Application Data

(63) Continuation of application No. 14/540,794, filed on Nov. 13, 2014, now Pat. No. 10,037,532.

(51) Int. Cl.
*G06Q 20/40* (2012.01)
*G06Q 20/32* (2012.01)

(52) U.S. Cl.
CPC ..... *G06Q 20/4016* (2013.01); *G06Q 20/3224* (2013.01); *G06Q 20/4015* (2020.05)

(58) Field of Classification Search
CPC ........... G06Q 20/4016; G06Q 20/4015; G06Q 20/3224

See application file for complete search history.

(56) References Cited

U.S. PATENT DOCUMENTS 6,883,708 B1 4/2005 Fiedler et al.
7,761,381 B1 * 7/2010 Fitch ...................... G06Q 20/40
705/44

(Continued)

OTHER PUBLICATIONS

Whitrow et al., "Transaction aggregation as a strategy for credit card fraud detection", Springer Science+Business Media, Jul. 30, 2008. (Year: 2008).*

*Primary Examiner* — Eric T Wong
(74) *Attorney, Agent, or Firm* — Armstrong Teasdale LLP

(57) ABSTRACT

A computer-implemented method for detecting potentially fraudulent cardholder transactions is implemented by a fraud detection computer system in communication with a memory. The method includes identifying a first home location for a first cardholder, identifying an expected range of travel relative to the first home location for the first cardholder when making a typical financial transaction in at least one merchant category, receiving transaction data associated with a first financial transaction, retrieving the first home location based on the cardholder data and a merchant location for the first merchant based on the merchant data, calculating a distance of travel between the first merchant location and the cardholder home location, comparing the calculated distance of travel to the expected range of travel, and flagging the first financial transaction as potentially fraudulent upon determining that the calculated distance of travel exceeds the expected range of travel.

20 Claims, 8 Drawing Sheets

(56) References Cited

U.S. PATENT DOCUMENTS

| | | | |
|---|---|---|---|
| 7,792,770 B1* | 9/2010 | Phoha | G06N 20/00 |
| | | | 706/45 |
| 7,815,106 B1* | 10/2010 | McConnell | G06Q 30/02 |
| | | | 235/376 |
| 8,032,438 B1* | 10/2011 | Barton | G06Q 20/206 |
| | | | 705/35 |
| 8,473,415 B2 | 6/2013 | Siegel et al. | |
| 8,600,875 B2 | 12/2013 | Ciurea | |
| 8,712,855 B1* | 4/2014 | Weigman | G06Q 20/20 |
| | | | 705/16 |
| 8,805,737 B1 | 8/2014 | Chen et al. | |
| 9,098,852 B1* | 8/2015 | Dangott | G06Q 20/3224 |
| 2002/0099649 A1* | 7/2002 | Lee | G06Q 20/4016 |
| | | | 705/38 |
| 2005/0182712 A1* | 8/2005 | Angell | G06Q 20/40 |
| | | | 705/39 |
| 2009/0132347 A1 | 5/2009 | Anderson et al. | |
| 2012/0036013 A1* | 2/2012 | Neuhaus | G06Q 30/02 |
| | | | 705/14.53 |
| 2012/0144498 A1 | 6/2012 | Buhrmann et al. | |
| 2012/0226551 A1* | 9/2012 | Bhagchandani | G06Q 30/0255 |
| | | | 705/14.52 |
| 2013/0024358 A1* | 1/2013 | Choudhuri | G06Q 20/4016 |
| | | | 705/38 |
| 2013/0110715 A1* | 5/2013 | Buchhop | G06Q 40/02 |
| | | | 705/42 |
| 2013/0211911 A1 | 8/2013 | Krietzman | |
| 2014/0040155 A1 | 2/2014 | Buhrmann et al. | |
| 2014/0236678 A1* | 8/2014 | Akerman | G06F 16/9537 |
| | | | 705/7.34 |
| 2015/0193768 A1* | 7/2015 | Douglas | G06Q 20/405 |
| | | | 705/44 |

\* cited by examiner

SYSTEMS AND METHODS FOR DETECTING TRANSACTION CARD FRAUD BASED ON GEOGRAPHIC PATTERNS OF PURCHASES

CROSS REFERENCE TO RELATED APPLICATIONS

This application is a continuation application of U.S. patent application Ser. No. 14/540,794 filed Nov. 13, 2014, entitled "SYSTEMS AND METHODS FOR DETECTING TRANSACTION CARD FRAUD BASED ON GEOGRAPHIC PATTERNS OF PURCHASES", the disclosure of which is hereby incorporated herein by reference in its entirety.

BACKGROUND OF THE DISCLOSURE

The field of the disclosure relates generally to fraud detection, and more specifically to methods and systems for detecting transaction card fraud based on geographic patterns of purchases.

At least some consumer transactions that are initiated with transaction cards are done so fraudulently. Transaction cards may be stolen, used without the appropriate permission, misappropriated, or otherwise used in a fraudulent manner by a "cardholder" that is not validly associated with the transaction card (i.e., a fraudulent cardholder). Such fraudulent consumer transactions pose risks or inconveniences to the parties involved in the consumer transaction ranging from the actual cardholder (the party the transaction card was issued to by the issuing bank) to the merchant and to the merchant bank and the issuer bank. Accordingly, fraud detection methods are valuable to all such parties.

BRIEF DESCRIPTION OF THE DISCLOSURE

In one aspect, a computer-implemented method for detecting potentially fraudulent cardholder transactions is provided. The method is implemented by a fraud detection computer system in communication with a memory. The method includes identifying a first home location for a first cardholder, the first home location based at least partially on historical transaction data associated with the first cardholder, identifying an expected range of travel relative to the first home location for the first cardholder when making a typical financial transaction in at least one merchant category, receiving transaction data associated with a first financial transaction initiated by the first cardholder with a first merchant, the transaction data including merchant data and cardholder data, the first merchant being included within the at least one merchant category, retrieving the first home location based on the cardholder data and a merchant location for the first merchant based on the merchant data, calculating, by the fraud detection computer system, a distance of travel between the first merchant location and the cardholder home location, comparing the calculated distance of travel to the expected range of travel for the at least one merchant category, and flagging the first financial transaction as potentially fraudulent upon determining that the calculated distance of travel exceeds the expected range of travel.

In another aspect, a fraud detection computer system used to detect potentially fraudulent cardholder transactions is provided. The fraud detection computer system includes a processor, and a memory coupled to the processor. The fraud detection computer system is configured to identify a first home location for a first cardholder, the first home location based at least partially on historical transaction data associated with the first cardholder, identify an expected range of travel relative to the first home location for the first cardholder when making a typical financial transaction in at least one merchant category, receive transaction data associated with a first financial transaction initiated by the first cardholder with a first merchant, the transaction data including merchant data and cardholder data, the first merchant being included within the at least one merchant category, retrieve the first home location based on the cardholder data and a merchant location for the first merchant based on the merchant data, calculate a distance of travel between the first merchant location and the cardholder home location, compare the calculated distance of travel to the expected range of travel for the at least one merchant category, and flag the first financial transaction as potentially fraudulent upon determining that the calculated distance of travel exceeds the expected range of travel.

In a further aspect, computer-readable storage media for detecting potentially fraudulent cardholder transactions is provided. The computer-readable storage media has computer-executable instructions embodied thereon. When executed by at least one processor, the computer-executable instructions cause the processor to identify a first home location for a first cardholder, the first home location based at least partially on historical transaction data associated with the first cardholder, identify an expected range of travel relative to the first home location for the first cardholder when making a typical financial transaction in at least one merchant category, receive transaction data associated with a first financial transaction initiated by the first cardholder with a first merchant, the transaction data including merchant data and cardholder data, the first merchant being included within the at least one merchant category, retrieve the first home location based on the cardholder data and a merchant location for the first merchant based on the merchant data, calculate a distance of travel between the first merchant location and the cardholder home location, compare the calculated distance of travel to the expected range of travel for the at least one merchant category, and flag the first financial transaction as potentially fraudulent upon determining that the calculated distance of travel exceeds the expected range of travel.

BRIEF DESCRIPTION OF THE DRAWINGS

The figures listed below show example embodiments of the methods and systems described herein.

FIG. 1 is a schematic diagram illustrating an example multi-party payment card system for enabling payment-by-card transactions and detecting potentially fraudulent cardholder transactions in accordance with one embodiment of the present disclosure.

FIG. 2 is an expanded block diagram of an example embodiment of a computer system used in processing payment transactions that includes a fraud detection computer system in accordance with one example embodiment of the present disclosure.

FIG. 3 illustrates an is an expanded block diagram of an example embodiment of a computer device architecture of a system used to detect potentially fraudulent cardholder transactions in accordance with one example embodiment of the present disclosure.

FIG. 4 illustrates an example configuration of a server system such as the fraud detection computer system of FIGS. 2 and 3 used to detect potentially fraudulent cardholder transactions in accordance with one example embodiment of the present disclosure.

FIG. 5 is a simplified data flow diagram for detecting potentially fraudulent cardholder transactions using the fraud detection computer system of FIGS. 2 and 3.

FIG. 6 is a detailed logic flow diagram for detecting potentially fraudulent cardholder transactions using the fraud detection computer system of FIGS. 2 and 3.

FIG. 7 is a simplified diagram of an example method for detecting potentially fraudulent cardholder transactions using the fraud detection computer system of FIGS. 2 and 3.

FIG. 8 is a diagram of components of one or more example computing devices that may be used in the environment shown in FIG. 5.

Figure 1:
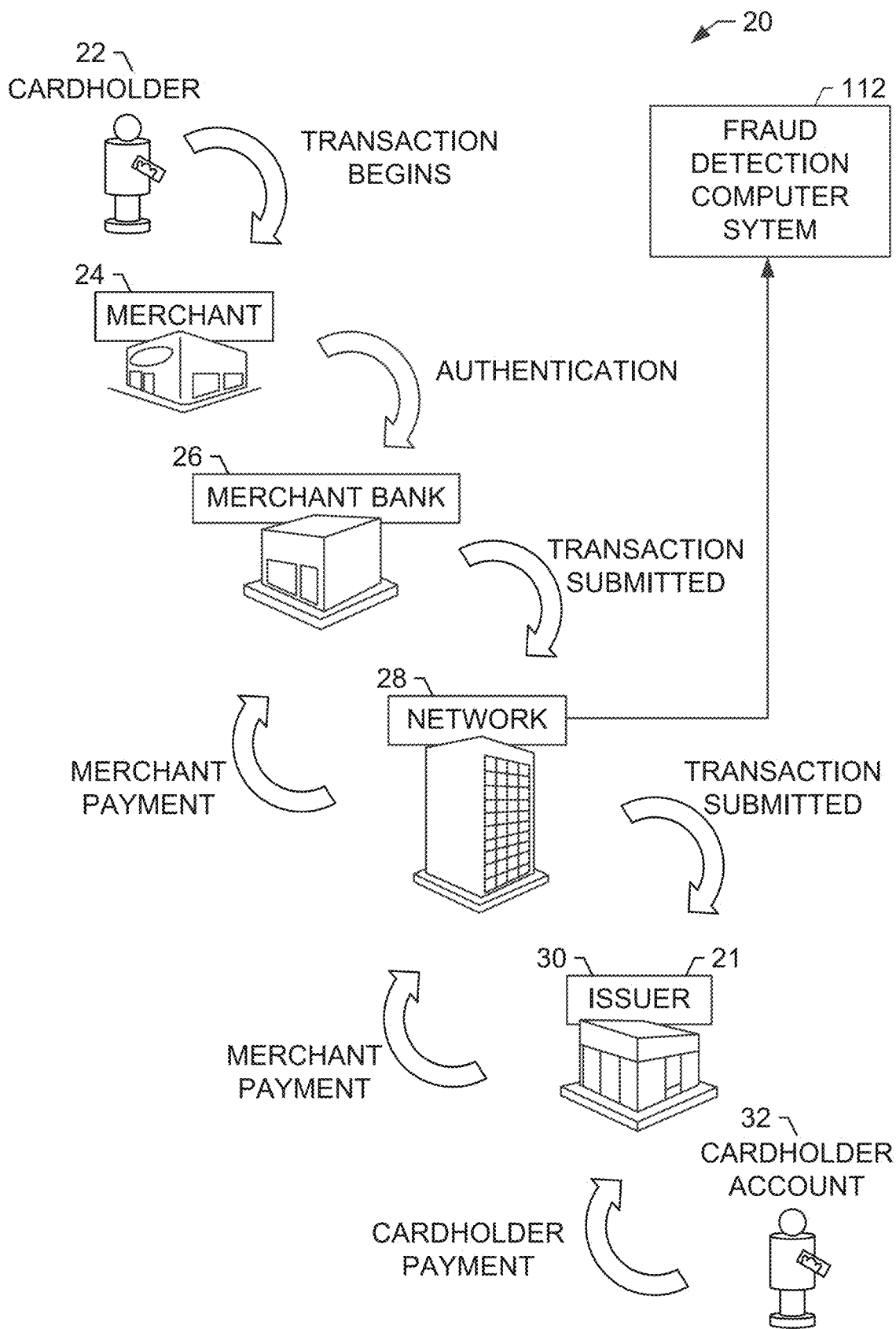
FIGS. 1-8 show example embodiments of the methods and systems described herein.

Although specific features of various embodiments may be shown in some drawings and not in others, this is for convenience only. Any feature of any drawing may be referenced and/or claimed in combination with any feature of any other drawing.

DETAILED DESCRIPTION OF THE DISCLOSURE

In at least some examples, cardholders typically make purchases within a certain distance from their home, residence, or other primary locations such as workplaces. Such locations may be referred to as "cardholder home locations." As used herein, cardholder home locations may describe one such location for a cardholder, a plurality of locations for the cardholder, or an area that includes a plurality of locations for the cardholder.

For example, some cardholders may make most purchases within a twenty mile distance (or range) of their home residence. This distance may be referred to as a typical range of travel, a typical purchasing radius, or a typical purchasing range. Such a typical range of travel may vary depending upon a variety of factors including, for example, a merchant category and the geographic area associated with a cardholder home location. When transaction data indicates that a cardholder has travelled a distance to make a transaction that is greater than that which is normally expected, such transaction data may indicate that a fraudulent cardholder transaction is taking place because a party other than the cardholder is making transactions outside of the typical range of travel. Methods for determining typical ranges of travel, and using such typical ranges of travel to identify unusual transaction data may therefore be beneficial to detect potentially fraudulent cardholder activity.

Accordingly, the systems and methods described herein facilitate the detection of fraudulent cardholder transactions based on a deviation from usual patterns of travel for purchase. The systems and methods described are facilitated by a computing device known as a fraud detection computer system. The fraud detection computer system includes a processor in communication with a memory. The fraud detection computer system is configured to: (i) identify a first home location for a first cardholder, the first home location based at least partially on historical transaction data associated with the first cardholder, (ii) identify an expected range of travel relative to the first home location for the first cardholder when making a typical financial transaction in at least one merchant category, (iii) receive transaction data associated with a first financial transaction initiated by the first cardholder with a first merchant, the transaction data including merchant data and cardholder data, the first merchant being included within the at least one merchant category, (iv) retrieve the first home location based on the cardholder data and a merchant location for the first merchant based on the merchant data, (v) calculate a distance of travel between the first merchant location and the cardholder home location, (vi) comparing the calculated distance of travel to the expected range of travel for the at least one merchant category, and (vii) flag the first financial transaction as potentially fraudulent upon determining that the calculated distance of travel exceeds the expected range of travel.

The fraud detection computer system determines a typical range of travel associated with a cardholder making a typical financial transaction ("expected range of travel" or "typical range of travel"). As used herein, a "typical financial transaction" represents a financial transaction made by a generic cardholder that is normally expected based on previous transaction data.

In the example embodiment, the typical range of travel (or purchasing range) is determined by the fraud detection computer system. The fraud detection computer system receives a plurality of historical transaction data associated with a plurality of historical transactions and analyzes the historical transaction data. The fraud detection computer system segments (or divides) the historical transaction data by cardholder. Such segmented historical transaction data is analyzed to determine distances travelled for each transaction and average distances traveled by cardholders.

More specifically, the fraud detection computer system processes the segmented historical transaction data to identify historical merchant data and historical cardholder data. Historical merchant data represents information related to each merchant of the historical transaction data. Historical merchant data includes historical merchant location data that may be used to identify the location of the merchant ("historical merchant location") associated with each transaction of the historical merchant data. Such historical merchant location data may include, for example and without limitation, a zip code, a postal code, a street address, a regional identifier, latitude and longitude values, and any combination thereof. In at least some examples, the historical merchant location data is included within ordinary transaction data, as described below. In such embodiments, historical merchant location data directly identifies historical merchant locations (e.g., a street address or a zip code). In alternative examples, the historical merchant location may be derived based on ordinary transaction data. For example, a merchant identifier may be used to reference a merchant profile stored at a merchant database. The merchant profile may contain specific merchant location data.

Similarly, historical cardholder data includes historical cardholder location data. The fraud detection computer system uses such historical cardholder location data to identify a first home location (or "cardholder home location" or "cardholder home") associated with each cardholder-specific segment of the segmented historical transaction data.

As described herein, the fraud detection computer system calculates the first home location based on all of the segmented historical transaction data associated with the particular cardholder. Accordingly, in one example, the cardholder location data is actually all of the cardholder-specific segmented historical transaction data. In such embodiments, segmented historical transaction data does not directly identify the first home location. However, by processing all segmented historical transaction data, the fraud detection computer system determines the first home location based on the merchant locations for merchants with which the cardholder engages in repeated transactions. More specifically, when the cardholder engages in a card-present transaction at a merchant with an elevated rate of frequency (as compared to the frequency of purchases by the cardholder with other merchants generally), the fraud detection computer system determines that the cardholder resides near such a merchant. Upon identification of such elevated-frequency merchants, the fraud detection computer system determines the location of each of the identified merchants based on historical merchant location data. The first home location may therefore be determined based on the locations of the identified merchants. More specifically, the fraud detection computer system determines the first home location as a central location between the merchant locations for elevated-frequency merchants.

In at least some examples, the fraud detection computer system determines the first home location by analyzing historical transaction data associated with particular merchant categories (or categories of purchase). Generally speaking, certain merchant categories will occur at higher frequencies near a first home location. For example, transactions with merchant categories of "groceries" and "gas" often occur near a first home location. Accordingly, in such examples, the fraud detection computer system determines the first home location by processing segmented historical transaction data to determine where the cardholder makes frequent transactions in particular merchant categories. In the example embodiment, such particular merchant categories are "groceries" and "gas". In alternative embodiments, other merchant categories may be used. By applying this filter of merchant categories, the fraud detection computer system may identify first home locations more efficiently by not incorporating potential outlier transactions.

Upon calculating the first home location, the fraud detection computer system stores the first home location may at a database, memory, any other suitable storage device. In the example embodiment, the fraud detection computer system stores the first home location in a lookup table associating the cardholder identifier (e.g., a primary account number) with the calculated first home location. Alternately, any suitable file or data structure may be used. Accordingly, in such examples, the cardholder identifier may be used as cardholder location data to look up a first home location.

In at least some examples, cardholders may have a workplace, a second residence, or an alternative location associated with high-frequency purchases. Therefore, "first home location" may refer not only to the physical location of the cardholder's home, but also to any location where the cardholder spends significant time. Because the fraud detection computer system is aimed at identifying unusual purchase patterns, identifying normal behaviors (such as workplace purchases) may be useful. In such examples where "first home location" refers to additional locations, other particular merchant categories may be used to identify first home location. For example, when first home location includes a workplace, the merchant category of "restaurants" may be used to identify the first home location since the cardholder may eat meals near their workplace. In at least some examples, the fraud detection computer system determines the cardholder workplace based on weekday transactions at restaurants between 11:00 AM and 1:00 PM and associates the cardholder workplace with the first home location.

In the example embodiment, the fraud detection computer system recalculates and stores the first home location at periodic intervals (e.g., weekly, monthly, quarterly, or yearly) to identify whether the cardholder has moved or otherwise changed first home location. The fraud detection computer system assigns segmented historical transaction data to the calculated first home location (or residences if the first home location is recalculated). However, the historical merchant location may vary for each transaction. Accordingly, while the fraud detection computer identifies a first home location and a historical merchant location for each transaction using the methods described above, the first home location will typically be constant over a time period while the merchant location may vary.

Upon identifying the historical merchant location and the first home location for each historical transaction associated with the segmented historical transaction data, the fraud detection computer system determines (or calculates) a distance travelled between the first home location and the historical merchant location, for each transaction. In at least some examples, the historical merchant location or the first home location may describe a region (e.g., a zip code or a postal code) rather than a fixed point. In such examples, algorithms may be used to estimate the distance travelled to or from a central region in such an area. In additional examples, the distance traveled may be determined using mapping systems and algorithms.

The fraud detection computer system uses the plurality of calculated distances travelled to determine a typical range of travel (or purchasing range) for cardholders, generally. In at least some examples, the typical range of travel is a mathematical average of the calculated distances travelled. In further examples, other mathematical and statistical approaches are used to identify typical ranges of travel. In one additional example, the typical range of travel may be the range of travel that includes a certain percentage of the historical transaction data. In other words, in this example the distances travelled for the certain percentage of historical transaction data is less than or equal to the typical range of travel.

In at least some examples, the typical range of travel may vary depending on cardholder characteristics and transaction characteristics. For example, cardholders residing in areas of lower population density may have fewer nearby merchants than normal. Resultantly, distances travelled by such cardholders between the first home location and the merchant location may be comparatively greater than a typical range of travel for other areas (or the average population). Alternately, cardholders residing in areas of higher population density may have more nearby merchants than normal. Resultantly, distances travelled by such cardholders between the first home location and the merchant location may be comparatively lesser than a typical range of travel. In such examples, the fraud detection computer system may process a typical range of travel distinct to such an area (or groups of similar areas). The fraud detection computer system identifies such a geographic region or geographic regions (e.g., low population density rural areas) and processes the plurality of historical transaction data to identify a plurality of typical distances travelled by cardholders with first home locations within such an area or geographic region. The fraud detection computer system determines a typical range of travel for the cardholders with first home locations within such an area geographic region by processing the plurality of distances travelled using mathematical or statistical methods such as those described above.

Alternately, typical distances travelled by cardholders may vary depending on the category of purchase. For example, some cardholders may normally make purchases for groceries within a relatively close distance of their c first home location (e.g., 5 miles) while making purchases for entertainment and movies at a greater range of travel from their first home location (e.g., 20 miles). Therefore, while such a cardholder purchasing tickets at a movie theater 15 miles from their first home location may be normal, purchasing groceries 15 miles from their first home location may be abnormal. Therefore, in some examples, the fraud detection computer system may identify a group of merchant categories and process the plurality of historical transaction data to identify a plurality of distances travelled by cardholders for each of the group of merchant categories. The fraud detection computer system also determines a typical range of travel made by cardholders for each of the group of merchant categories.

In an example embodiment, the fraud detection computer system determines the typical range of travel as a factor of both merchant category and geographic region or area. In such an example, the typical range of travel may be a distance traveled between a first home location and a merchant location for a minimum percentage (e.g., 90%) of transactions for the particular geographic region and the merchant category. In additional examples, multiple typical ranges are determined for multiple minimum percentages of transactions. For example, a first typical range of travel may be the range that includes 90% of travel while a second typical range of travel may be the range that includes 95% of travel. Such additional typical ranges may be used in fraud analysis. For example, when a financial transaction falls within the 95% range but not the 90% range, an alert may not be issued while an alert is issued when a financial transaction falls outside of the 95% range. The fraud detection computer system stores the typical range or ranges of travel in a database or memory. In one example, the typical ranges of travel are stored as a reference table that may be keyed based on factors including geographic region and merchant category.

As described above and herein, the fraud detection computer system detects potential fraud based on transaction data by identifying transactions wherein the distance traveled between the first home location and the merchant location exceeds the typical range of travel (generally, or segmented by factors as described above.) To avoid potential false positives, the fraud detection computer system may also determine thresholds by which the distance traveled may exceed the typical range of travel before a transaction is flagged or an alert is issued. In the example embodiment, the typical range of travel is the range that includes the distance traveled for 90% of transactions (generally or segmented by factors). In alternative embodiments, the typical range of travel is the range of travel that includes distances traveled for any other suitable percentage of transactions including, for example and without limitation, 10% of transactions, 25% of transactions, 50% of transactions, and 75% of transactions. However, depending upon the circumstances, the typical range of travel may be associated with any suitable percentage of transactions. In a first example, the threshold is set to zero and any transactions with travel exceeding the typical range of travel are flagged by the fraud detection computer system as potentially fraudulent. In a second example, the threshold is set to a fixed value of tolerance (e.g., five miles) and only transactions with travel exceeding the typical range of travel by the fixed value are flagged by the fraud detection computer system as potentially fraudulent. In a third example, the threshold is determined variably based on characteristics of the previously discussed historical transaction data. For example, the distribution of cardholder travel may indicate that 90% of transactions are within 10 miles while 95% of transactions are within 11 miles. Thus, 5% of transactions have travel associated that exceeds the typical range of travel by 1 mile. Because those 5% could trigger potentially incorrect false positives, the threshold may be set at 1 mile. The fraud detection computer system may accordingly receive or determine such threshold values and store the threshold values with the associated typical range of travel. Threshold values may be associated with particular geographic regions and particular merchant categories in a manner similar to typical ranges of travel.

The fraud detection computer system receives a plurality of transaction data associated with a financial transaction. Like the historical transaction data, the plurality of transaction data includes similar merchant data and cardholder data. The merchant data includes merchant location data and the cardholder data includes cardholder location data. Using similar methods to those described above, the merchant location may be identified based on merchant location data and the first home location (or cardholder home or cardholder home location) may be determined based on the cardholder location data. Specifically, the merchant location data is typically included in transaction data as a merchant address, a merchant zip code, or a merchant postal code. The fraud detection computer system identifies the cardholder home by querying a lookup table, using a cardholder identifier such as a primary account number ("PAN") in the query, to determine a previously calculated cardholder home. As described above, using such a lookup table (or any other suitable file) allows the fraud detection computer system to efficiently identify cardholder homes without recalculating them for each financial transaction. However, in some alternatives, the cardholder location data and cardholder home may be recalculated using methods described herein.

The fraud detection computer system also calculates a distance of travel between the cardholder home (or cardholder home location) and the merchant location. Calculating the distance of travel may represent a simple calculation of linear distance or an application of mapping or routing algorithms to determine a predicted actual distance travelled. Alternately, the distance of travel may be calculated by identifying a central location within a region (e.g., when first home location or merchant location is a postal code rather than a specific point) and determining the distance traveled based on the determined central location or central locations.

The fraud detection computer system compares the calculated distance of travel to the previously calculated typical range of travel. Specifically, the fraud detection computer system retrieves the typical range of travel from the reference table and determines whether the calculated distance of travel exceeds the typical range of travel. In at least some examples, the fraud detection computer system determines a merchant category associated with the financial transaction and identifies a typical range of travel associated with the merchant category from the reference table. In other examples, the fraud detection computer system determines a geographic region associated with the financial transaction based on the first home location and identifies a typical range of travel associated with the geographic region, from the reference table. In such examples, the reference table may identify the geographic region such that the fraud detection computer system may identify the first home location as within the geographic region. In further examples, the fraud detection computer system determines a merchant category and a geographic region associated with the financial transaction and identifies a typical range of travel associated with both the geographic region and the merchant category.

The fraud detection computer system determines whether the calculated distance exceeds the typical range of travel (whether general or specific to a merchant category, a geographic region, or combinations thereof). If the calculated distance exceeds the typical range of travel, the fraud detection computer system flags the associated financial transaction as potentially fraudulent. Flagging represents the fraud detection computer system updating a record associated with the financial transaction to indicate that the financial transaction may require investigation or follow-up. The fraud detection computer system may additionally send an alert to a fraud management system to further investigate the potentially fraudulent financial transaction. In some examples, the fraud detection computer system retrieves threshold value associated with the typical range of travel. In such examples, the fraud detection computer system determines whether the calculated distance exceeds the typical range of travel in an amount exceeding the threshold value. If the calculated distance exceeds the typical range of travel by an amount exceeding the threshold value, the fraud detection computer system flags the associated financial transaction as potentially fraudulent.

At least some cardholders may routinely exceed the typical range of travel. For example, cardholders that travel regularly for professional purposes may often make financial transactions with calculated distances that exceed the typical range of travel. Accordingly, in at least some examples, the fraud detection computer system may identify such cardholders as "mobile cardholders" to avoid identifying transactions from such mobile cardholders as potentially fraudulent. A cardholder may be identified as a mobile cardholder based on historical transaction data. Specifically, cardholders with historical distances traveled that routinely exceed the typical range of travel (e.g., a majority of the cardholders' transactions exceed the typical range of travel by more than the threshold values) may be identified as a mobile cardholder. The designation of "mobile cardholder" may be indicated in a cardholder profile located at the lookup table. Because the cardholder profile is stored in the lookup table, it is also associated with a cardholder identifier. Accordingly, in the example embodiment, when the fraud detection computer system receives transaction data associated with a mobile cardholder, the fraud detection computer system may determine that the cardholder is a mobile cardholder by retrieving a cardholder profile from the lookup table, using the cardholder identifier. If the cardholder profile indicates that the cardholder has regularly exceeded the typical range of travel (e.g., that the cardholder is a mobile cardholder), the fraud detection computer system may authorize (e.g., not flag) the mobile cardholder's transactions as potentially fraudulent even when such transactions are associated with a calculated distance traveled that exceeds the typical range of travel.

Further, in at least some examples cardholders routinely travel during particular time periods. For example, in summer and winter holidays, many cardholders may travel significant distances. In at least some examples, the fraud detection computer system is configured to authorize transactions during such time periods even when such transactions are associated with a calculated distance traveled that exceeds the typical range of travel.

In some embodiments, the fraud detection computer system stores first home location information, cardholder profiles, and typical ranges of travel without including sensitive personal information, also known as personally identifiable information or PII, in order to ensure the privacy of individuals associated with the stored data. Personally identifiable information may include any information capable of identifying an individual. For privacy and security reasons, personally identifiable information may be withheld from the cardholder profiles. In some examples where privacy and security, such as through encryption, can otherwise be ensured, or where individuals consent, personally identifiable information may be retained in the cardholder profiles. In such examples, personally identifiable information may be needed to reports about groups of cardholders. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed. For example, an individual's identity may be processed so that no personally identifiable information can be determined for the individual, or an individual's geographic location may be generalized where location data is obtained (such as to a city, ZIP code, or state level), so that a particular location of an individual cannot be determined. Thus, the individual may have control over how information is collected about the individual and used by systems including the fraud detection computer system.

In an example embodiment, the fraud detection computer system detects potentially fraudulent cardholder transactions in a method described below. The fraud detection computer system identifies a first home location for a first cardholder. Specifically, the fraud detection computer system identifies the first home location based at least partially on historical transaction data associated with the first cardholder. The fraud detection computer system also identifies an expected range of travel relative to the first home location for the first cardholder when making a typical financial transaction in at least one merchant category. The "expected range of travel" as used herein is interchangeable with "typical range of travel". The fraud detection computer system additionally receives transaction data associated with a first financial transaction initiated by the first cardholder with a first merchant. The transaction data includes merchant data and cardholder data. The first merchant is included within the at least one merchant category. The fraud detection computer system also retrieves the first home location based on the cardholder data and a merchant location for the first merchant based on the merchant data and calculates a distance of travel between the first merchant location and the cardholder home location. The fraud detection computer system further compares the calculated distance of travel to the expected range of travel for the at least one merchant category and flags the first financial transaction as potentially fraudulent upon determining that the calculated distance of travel exceeds the expected range of travel.

In at least some embodiments, the fraud detection computer system is also configured to identify home locations for each cardholder of a plurality of cardholders. The first home location is included with the plurality of plurality of home locations. In other embodiments, the fraud detection computer system is configured to determine the expected range of travel for each cardholder included within the plurality of cardholders for making a purchase at a merchant within a physical location.

Through the identification of potentially fraudulent cardholder transactions, the systems and methods are further configured to facilitate (a) identifying fraud activity to cardholders, (b) reducing risk of loss to merchants due to fraudulent cardholder activity, and (c) reduce the time to detect a pattern of fraudulent cardholder transactions.

The technical effects of the systems and methods described herein can be achieved by performing at least one of the following steps: (a) identifying a first home location for a first cardholder, the first home location based at least partially on historical transaction data associated with the first cardholder; (b) identifying an expected range of travel relative to the first home location for the first cardholder when making a typical financial transaction in at least one merchant category; (c) receiving transaction data associated with a first financial transaction initiated by the first cardholder with a first merchant, the transaction data including merchant data and cardholder data, the first merchant being included within the at least one merchant category; (d) retrieving the first home location based on the cardholder data and a merchant location for the first merchant based on the merchant data; (e) calculating, by the fraud detection computer system, a distance of travel between the first merchant location and the cardholder home location; (0 comparing the calculated distance of travel to the expected range of travel for the at least one merchant category; (g) flagging the first financial transaction as potentially fraudulent upon determining that the calculated distance of travel exceeds the expected range of travel; (h) identifying a plurality of home locations for each cardholder of a plurality of cardholders, the first home location included with the plurality of plurality of home locations; (i) determining the expected range of travel for each cardholder included within the plurality of cardholders for making a purchase at a merchant within a physical location; (j) receiving historical transaction data associated with a plurality of historical transactions, wherein the historical transaction data includes historical merchant data and historical cardholder data; (k) determining a historical merchant location based on the historical merchant data and the first home location based on the historical cardholder data for each of the historical transactions; (l) calculating a distance travelled between each historical merchant location and each first home location; (m) determining a typical range of travel based on the calculated plurality of distances travelled for each historical transaction; (n) identifying a geographic region associated with each of the calculated plurality of distances travelled; (o) grouping the calculated plurality of distances travelled based on the identified geographic regions; (p) determining a typical range of travel for each of the plurality of identified geographic regions based on the grouped calculated plurality of distances travelled; (q) defining a threshold based on the received typical range of travel; (r) flagging the financial transaction as potentially fraudulent upon determining that the calculated distance exceeds the typical range by the defined threshold; (s) identifying a plurality of typical ranges for each of a plurality of transaction categories; (t) identifying, based on the transaction data, a transaction category associated with the financial transaction; (u) flagging the financial transaction as potentially fraudulent upon determining that the calculated distance exceeds the typical range associated with the transaction category; (v) receiving a plurality of historical transaction data associated with a plurality of historical transactions, wherein each of the plurality of historical transaction data includes historical merchant data and historical cardholder data, determining a historical merchant location and the cardholder home location for each of the plurality of historical transaction data, determining a historical transaction category associated with each of the plurality of historical transaction data, calculating a distance travelled between each historical merchant location and each cardholder home location, determining a typical range of travel for each transaction category based on the calculated plurality of distances travelled for each transaction category; (w) retrieving a profile associated with the cardholder; (x) identifying whether the cardholder has previously exceeded the typical range of travel based on the profile; and (y) authorizing the financial transaction upon determining that the calculated distance exceeds the typical range and also determining that the cardholder previously exceeded the typical range of travel.

The following detailed description of the embodiments of the disclosure refers to the accompanying drawings. The same reference numbers in different drawings may identify the same or similar elements. Also, the following detailed description does not limit the claims.

Described herein are computer systems such as fraud detection computer systems and consumer computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to the detection of potentially fraudulent financial transactions based on geographic patterns and geographic data.

FIG. 1 is a schematic diagram illustrating an example multi-party payment card system 20 for enabling payment-by-card transactions and detecting potentially fraudulent cardholder transactions in accordance with one embodiment of the present disclosure. Typical financial transaction institutions provide a suite of interactive, online applications to both current and prospective customers. For example, a financial transactions institution may have a set of applications that provide informational and sales information on their products and services to prospective customers, as well as another set of applications that provide account access for existing cardholders.

Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. Cardholder 22 may purchase goods and services ("products") at merchant 24. Cardholder 22 may make such purchases using virtual forms of the transaction card and, more specifically, by providing data related to the transaction card (e.g., the transaction card number, expiration date, associated postal code, and security code) to initiate transactions. To accept payment with the transaction card or virtual forms of the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card or virtual transaction card, merchant 24 requests authorization from a merchant bank 26 for the amount of the purchase. The request may be performed over the telephone or electronically, but is usually performed through the use of a point-of-sale terminal, which reads cardholder's 22 account information from a magnetic stripe, a chip, or embossed characters on the transaction card and communicates electronically with the transaction processing computers of merchant bank 26. Merchant 24 receives cardholder's 22 account information as provided by cardholder 22. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until products are shipped or services are delivered. However, with respect to at least some debit card transactions, a charge may be posted at the time of the transaction. When merchant 24 ships or delivers the products or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns products after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, information regarding the purchased item and/or service, and/or other suitable information, is associated with a transaction and transmitted between parties to the transaction as transaction data, and may be stored by any of the parties to the transaction. In the example embodiment, transaction data including such additional transaction data may also be provided to systems including fraud detection computer system 112. In the example embodiment, interchange network 28 provides such transaction data (including historical transaction data and ordinary transaction data) and additional transaction data. In alternative embodiments, any party may provide such data to fraud detection computer system 112.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described below in more detail, fraud detection computer system 112 may be used to detect potentially fraudulent financial transactions. Although the systems described herein are not intended to be limited to facilitate such applications, the systems are described as such for exemplary purposes.

Figure 2:
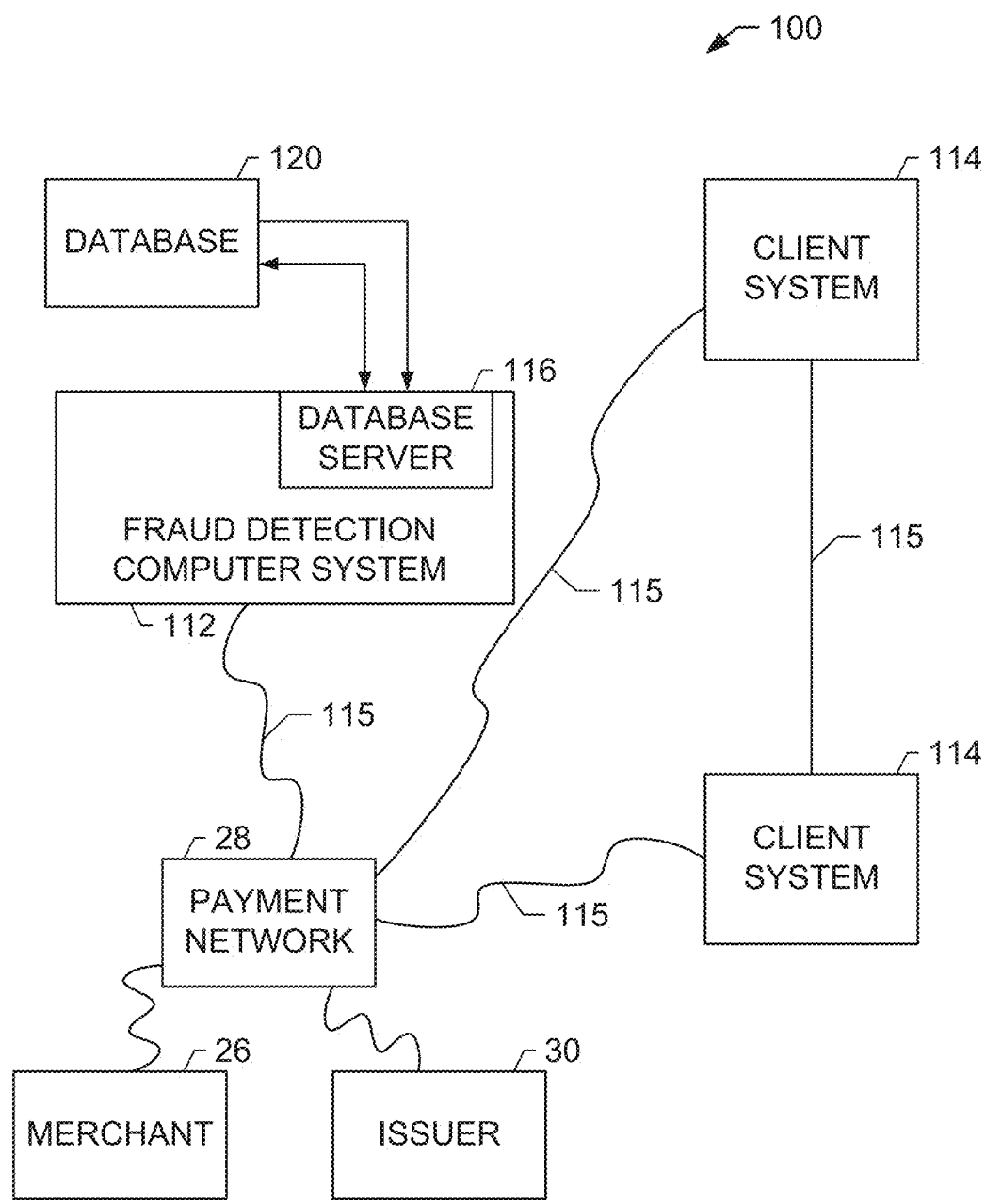

FIG. 2 is an expanded block diagram of an example embodiment of a computer system 100 used in processing payment transactions that includes fraud detection computer system 112 in accordance with one example embodiment of the present disclosure. In the example embodiment, system 100 is used for detecting potentially fraudulent financial transactions, as described herein. In other embodiments, the applications may reside on other computing devices (not shown) communicatively coupled to system 100, and may detect potentially fraudulent transactions using system 100.

More specifically, in the example embodiment, system 100 includes a fraud detection computer system 112, and a plurality of client sub-systems, also referred to as client systems 114, connected to fraud detection computer system 112. In one embodiment, client systems 114 are computers including a web browser, such that fraud detection computer system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 may include systems associated with cardholders 22 (shown in FIG. 1) as well as external systems used to store data. Fraud detection computer system 112 is also in communication with payment network 28 using network 115. Further, client systems 114 may additionally communicate with payment network 28 using network 115. Client systems 114 could be any device capable of interconnecting to the Internet including a web-based phone, PDA, or other web-based connectable equipment.

A database server 116 is connected to database 120, which contains information on a variety of matters, as described below in greater detail. In one embodiment, centralized database 120 is stored on fraud detection computer system 112 and can be accessed by potential users at one of client systems 114 by logging onto fraud detection computer system 112 through one of client systems 114. In an alternative embodiment, database 120 is stored remotely from fraud detection computer system 112 and may be non-centralized.

Database 120 may include a single database having separated sections or partitions, or may include multiple databases, each being separate from each other. Database 120 may store transaction data generated over the processing network including data relating to merchants, account holders, prospective customers, issuers, acquirers, and/or purchases made. Database 120 may also store account data including at least one of a cardholder name, a cardholder address, an account number, other account identifiers, and transaction information. Database 120 may also store merchant information including a merchant identifier that identifies each merchant registered to use the network, and instructions for settling transactions including merchant bank account information. Database 120 may also store purchase data associated with items being purchased by a cardholder from a merchant, and authorization request data. Further, database 120 may function to store lookup tables and reference tables. Lookup tables may contain cardholder profiles that may identify a first home location based on a cardholder identifier. Lookup tables may also identify whether a cardholder is a mobile cardholder. Reference tables contain typical ranges of travel. In some examples, reference tables include distinct typical ranges of travel for particular geographic regions, particular merchant categories, and other transaction or cardholder characteristics.

In the example embodiment, one of client systems 114 may be associated with acquirer bank 26 (shown in FIG. 1) while another one of client systems 114 may be associated with issuer bank 30 (shown in FIG. 1). Fraud detection computer system 112 may be associated with interchange network 28. In the example embodiment, fraud detection computer system 112 is associated with a network interchange, such as interchange network 28, and may be referred to as an interchange computer system. Fraud detection computer system 112 may be used for processing transaction data. In addition, client systems 114 may include a computer system associated with at least one of an online bank, a bill payment outsourcer, an acquirer bank, an acquirer processor, an issuer bank associated with a transaction card, an issuer processor, a remote payment system, customers and/or billers.

Figure 3:
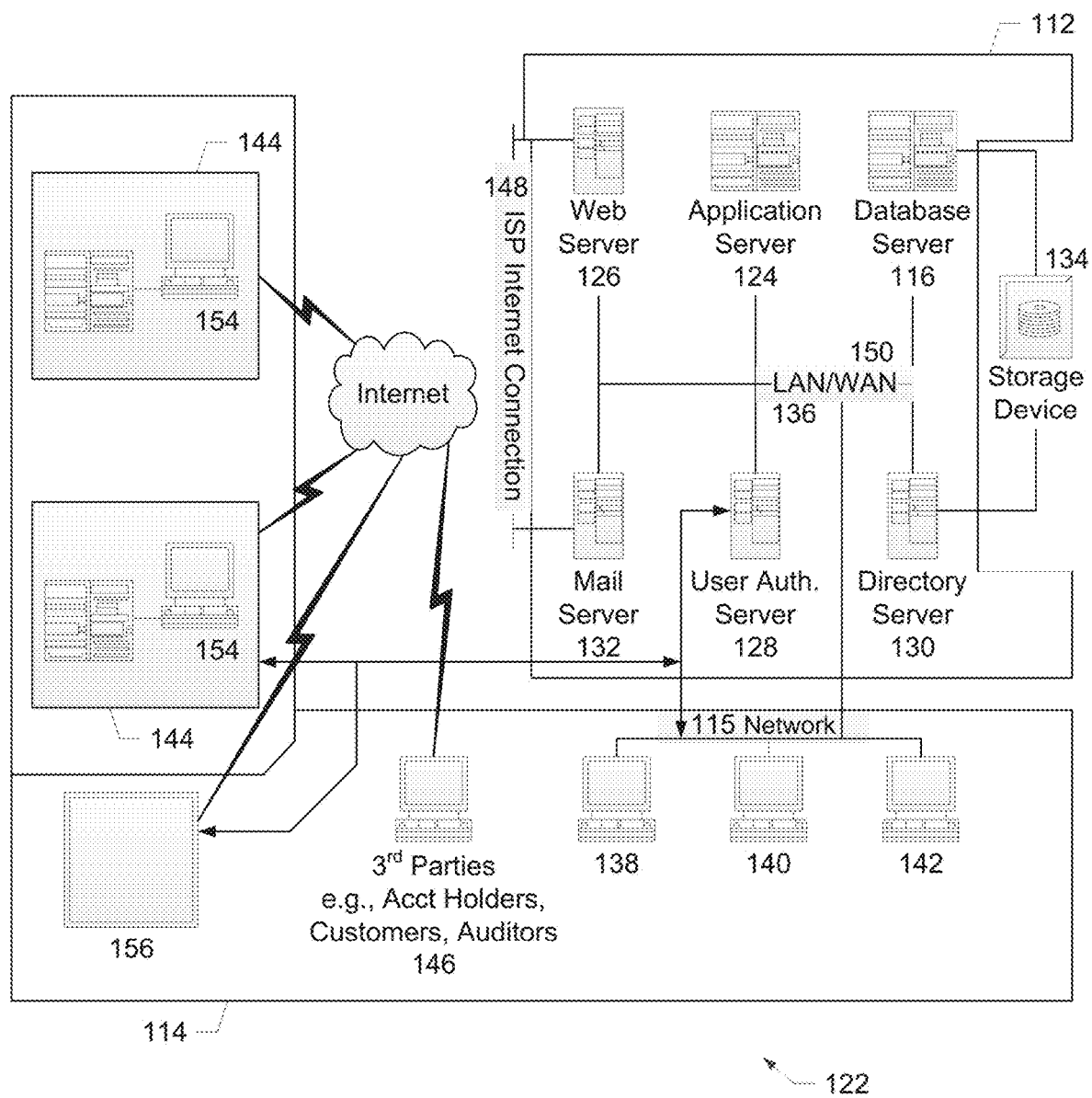

FIG. 3 is an expanded block diagram of an example embodiment of a computer device architecture of a system 122 used to detect potentially fraudulent cardholder transactions in accordance with one example embodiment of the present disclosure. Components in system 122, identical to components of system 100 (shown in FIG. 2), are identified in FIG. 3 using the same reference numerals as used in FIG. 2. System 122 includes fraud detection computer system 112, client systems 114, and payment systems 118. Fraud detection computer system 112 further includes database server 116, a transaction server 124, a web server 126, a user authentication server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Fraud detection computer system 112 is configured to be operated by various individuals including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150. Fraud detection computer system 112 is also configured to be communicatively coupled to payment systems 118. Payment systems 118 include computer systems associated with merchant bank 26, interchange network 28, issuer bank 30 (all shown in FIG. 1), and interchange network 28. Additionally, payments systems 118 may include computer systems associated with acquirer banks and processing banks. Accordingly, payment systems 118 are configured to communicate with fraud detection computer system 112 and provide transaction data as discussed below.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with fraud detection computer system 112.

Also, in the example embodiment, web server 126, application server 124, database server 116, and/or directory server 130 may host web applications, and may run on multiple server systems 112. The term "suite of applications," as used herein, refers generally to these various web applications running on server systems 112.

Furthermore, user authentication server 128 is configured, in the example embodiment, to provide user authentication services for the suite of applications hosted by web server 126, application server 124, database server 116, and/or directory server 130. User authentication server 128 may communicate with remotely located client systems, including a client system 156. User authentication server 128 may be configured to communicate with other client systems 138, 140, and 142 as well.

Figure 4:
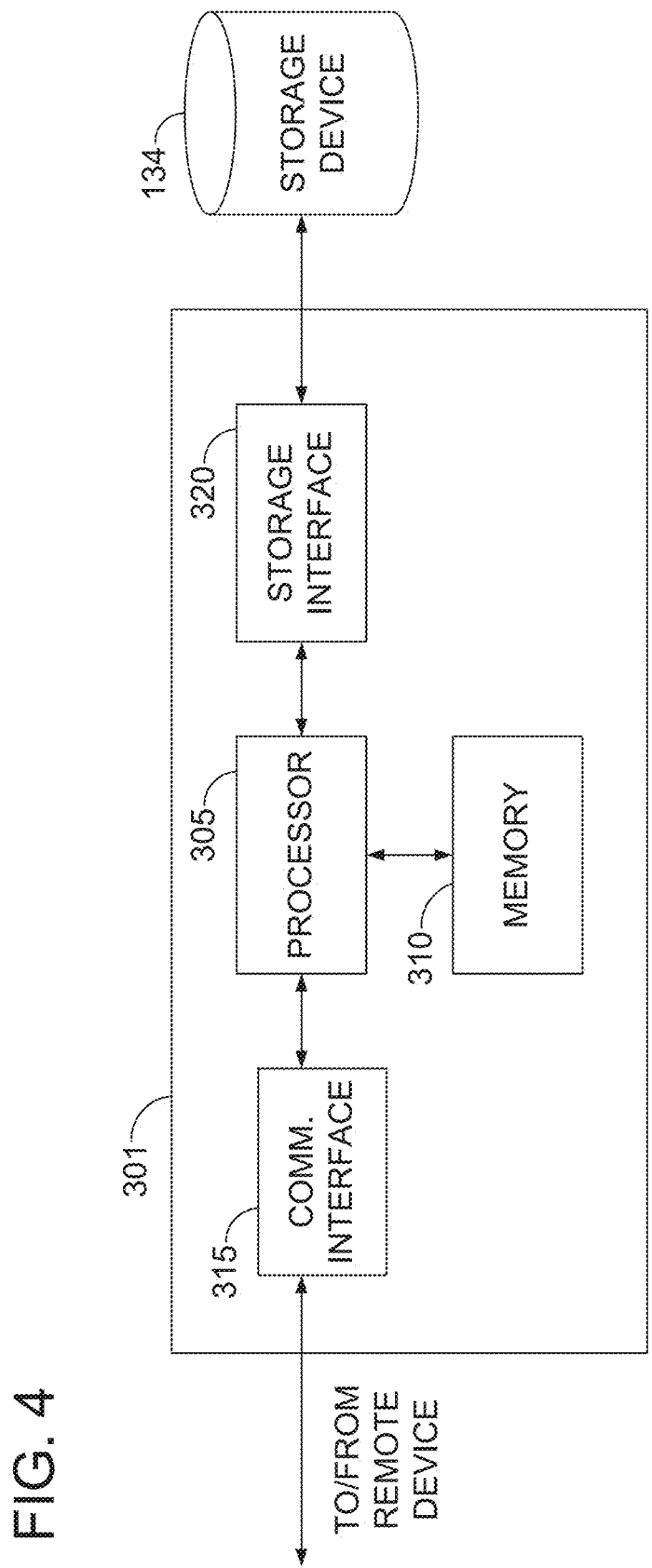

FIG. 4 illustrates an example configuration of a server system 301 such as fraud detection computer system 112 (shown in FIGS. 2 and 3) used to detect potentially fraudulent cardholder transactions in accordance with one example embodiment of the present disclosure. Server system 301 may include, but is not limited to, database server 116, transaction server 124, web server 126, user authentication server 128, directory server 130, and mail server 132. In the example embodiment, server system 301 determines and analyzes characteristics of devices used in payment transactions, as described below.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
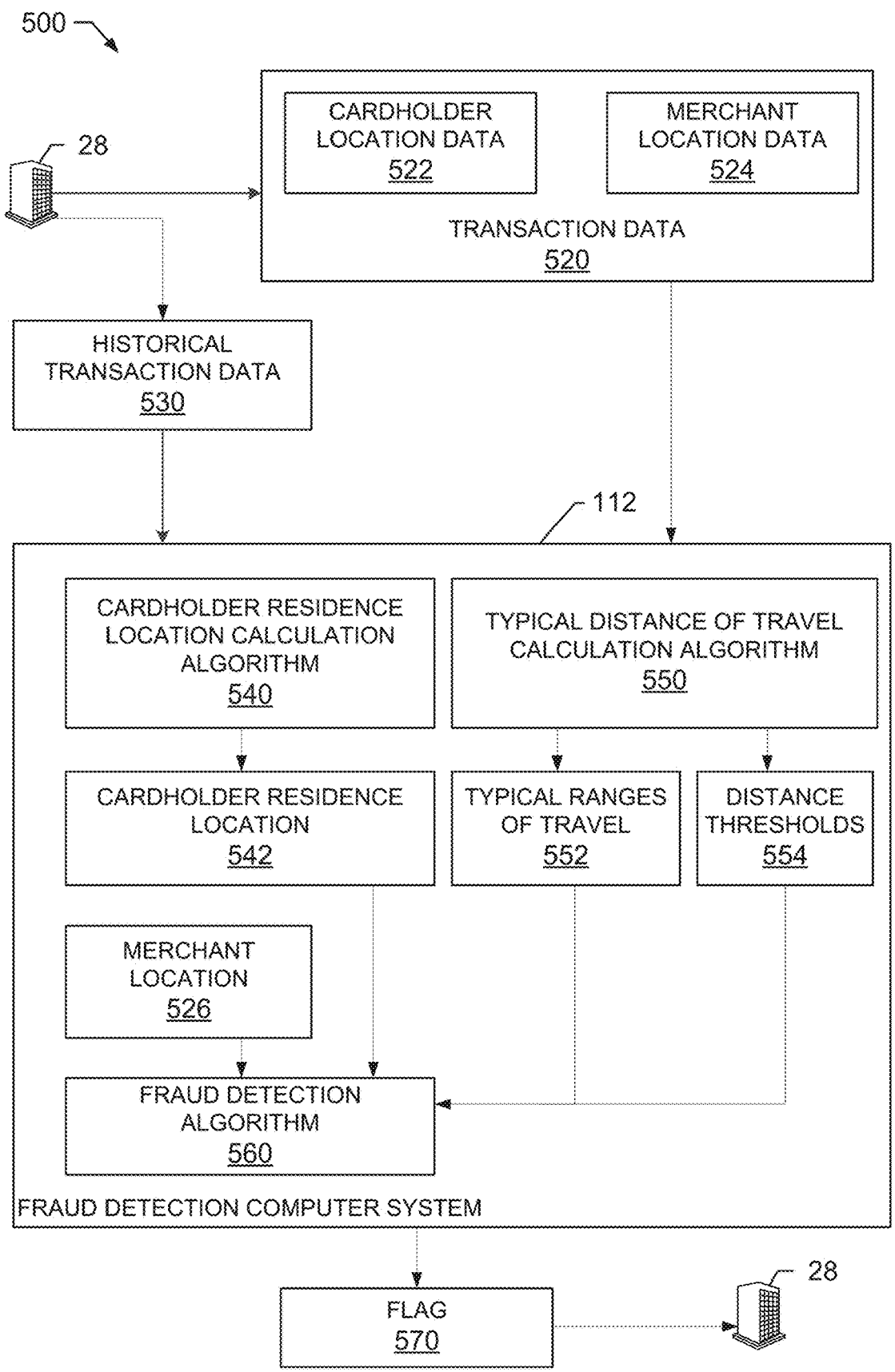

FIG. 5 is a simplified data flow diagram for detecting potentially fraudulent cardholder transactions using fraud detection computer system 112. Fraud detection computer system 112 receives a plurality of historical transaction data 530. In the example embodiment, the plurality of historical transaction data is received from payment network (or interchange network) 28. Alternately, fraud detection computer system 112 may receive plurality of historical transaction data 530 from any suitable system including any system associated with transaction parties 22, 24, 26, 28, 30, and 32 (shown in FIG. 1). Historical transaction data 530 includes historical merchant data and historical cardholder data. Historical merchant data includes historical merchant location data. Historical cardholder data includes historical cardholder location data. Fraud detection computer system 112 applies typical distance of travel calculation algorithm 550 to determine typical ranges of travel 552 and distance thresholds 554 based on historical transaction data 530.

More specifically, fraud detection computer system 112 executes typical distance of travel calculation algorithm 550 as follows. Fraud detection computer system 112 segments historical transaction data 530 and identifies a first home location using the cardholder location data and a historical merchant location using the historical merchant location data. Fraud detection computer system 112 calculates a distance travelled between the first home location and the historical merchant location for each transaction of historical transaction data 530. Using the methods described herein, fraud detection computer system 112 determines typical ranges of travel 552 and distance thresholds 554. In some examples, fraud detection computer system 112 determines typical ranges of travel 552 and distance thresholds 554 for specific geographic regions, specific merchant categories, and combinations thereof.

Fraud detection computer system 112 also receives a plurality of transaction data 520. Transaction data 520 includes cardholder location data 522 and merchant location data 524. Fraud detection computer system 112 applies cardholder home location calculation algorithm 540 to determine cardholder home locations 542 based on cardholder location data 522. In at least one example, cardholder home location calculation algorithm 540 represents performing a query to a lookup table based on cardholder location data 522 wherein cardholder location data 522 is a cardholder identifier. In other examples, cardholder home location algorithm 540 represents fraud detection computer system 112 processing historical transaction data 530 to determine cardholder home locations 542 based on the location of merchants with whom each cardholder transacted frequently. Fraud detection computer system 112 also determines merchant location 526 based on merchant location data 524. As described herein, merchant location 526 may be directly indicated in merchant location data 524 when merchant location data includes an address, a zip code, or a postal code. Alternately, merchant location 526 may be determined by querying a merchant database using merchant location data 524.

Fraud detection computer system 112 also performs fraud detection algorithm 560. Fraud detection algorithm 560 represents at least the following. Fraud detection computer system 112 identifies a geographic region and a merchant category associated with transaction data 520. Based on the merchant category and geographic region, fraud detection computer system 112 identifies typical ranges of travel 552 and distance thresholds 554. Fraud detection computer system 112 calculates a distance travelled for transaction data 520 between cardholder home location 542 and merchant location 526. Fraud detection computer system 112 determines whether the calculated distance travelled exceeds typical ranges of travel 552 and, if so, by more than distance thresholds 554. If the fraud detection computer system 112 determines that calculated distance travelled exceeds typical ranges of travel by more than distance thresholds 554, fraud detection computer system 112 generates a flag 570 associated with transaction data 520 that is sent to external systems. In the example embodiment, flag 570 is transmitted to fraud detection systems at interchange network 28.

Figure 6:
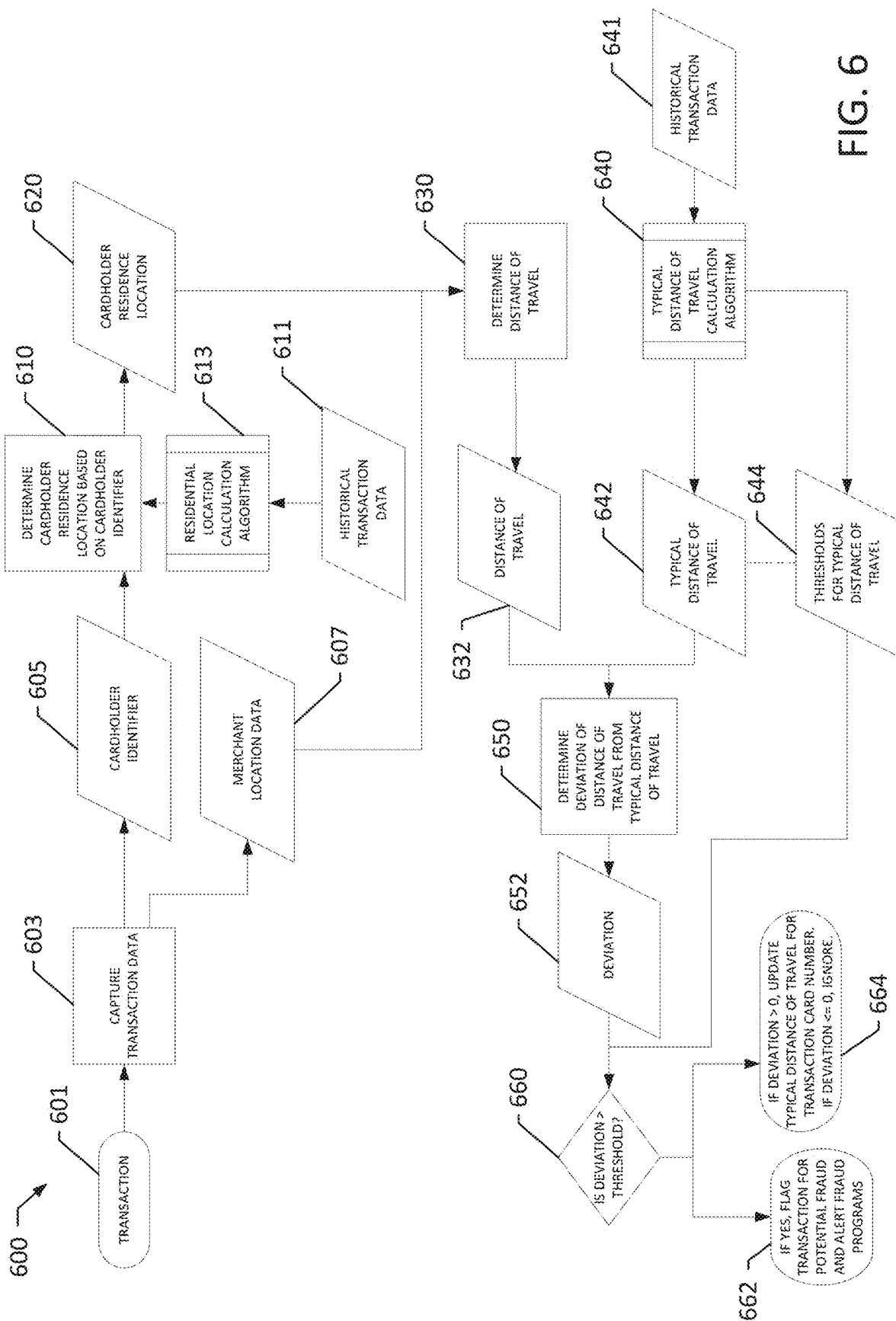

FIG. 6 is a detailed logic flow diagram for detecting potentially fraudulent cardholder transactions using fraud detection computer system 112 (shown in FIGS. 2 and 3). Fraud detection computer system 112 receives transaction 601 and captures transaction data 603. In the example embodiment, fraud detection computer system 112 captures at least cardholder identifier 605 (e.g., primary account number or transaction card number) and merchant location data 607. Fraud detection computer system determines cardholder home 610 based on cardholder identifier 605. Previously, fraud detection computer system 112 processes historical transaction data 611 and applies residential location calculation algorithm 613 to create a lookup table keyed to cardholder identifiers 605. Accordingly, fraud detection computer system 112 determines cardholder home location 610 using this previously created lookup table.

Fraud detection computer system 112 determines 630 a distance of travel 632 between the merchant location and cardholder home location 620. The merchant location is calculated based on merchant location data 607.

Fraud detection computer system 112 also processes historical transaction data 641 with typical distance of travel calculation algorithm 640 to determine typical distance of travel 642 and thresholds for typical distance of travel 644.

Fraud detection computer system 112 determines 650 a deviation 652 of distance of travel 632 from typical distance of travel 642. Fraud detection computer system 112 processes deviation 652 to determine 660 whether deviation exceeds thresholds for typical distance of travel 644. If fraud detection computer system 112 determines 660 deviation 652 exceeds thresholds 644, fraud detection computer system 112 generates 662 a flag for transaction 601 and alerts fraud programs. If deviation 652 is greater than zero but less than threshold 644, fraud detection computer system 112 updates typical distance of travel 642 for at least cardholder identifier 605. If deviation 652 is less than or equal to zero, fraud detection computer system 112 does not act on transaction 601.

Figure 7:
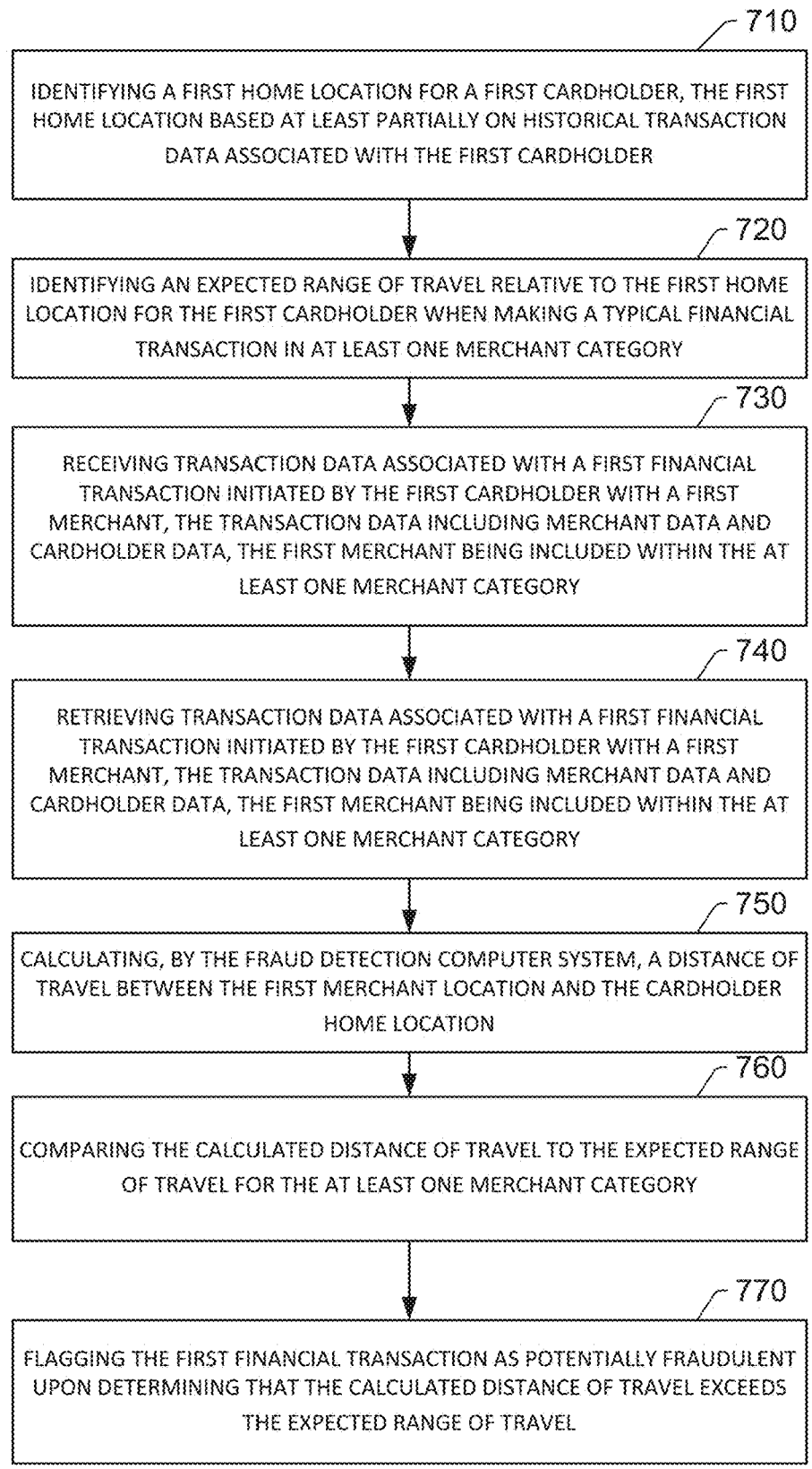

FIG. 7 is simplified diagram of an example method for detecting potentially fraudulent cardholder transactions using fraud detection computer system 112 (shown in FIGS. 2 and 3). Fraud detection computer system 112 identifies 710 a first home location for a first cardholder, the first home location based at least partially on historical transaction data associated with the first cardholder.

Fraud detection computer system 112 also identifies 720 an expected range of travel relative to the first home location for the first cardholder when making a typical financial transaction in at least one merchant category.

Fraud detection computer system 112 additionally receives 730 transaction data associated with a first financial transaction initiated by the first cardholder with a first merchant, the transaction data including merchant data and cardholder data, the first merchant being included within the at least one merchant category.

Fraud detection computer system 112 further retrieves 740 transaction data associated with a first financial transaction initiated by the first cardholder with a first merchant, the transaction data including merchant data and cardholder data, the first merchant being included within the at least one merchant category.

Fraud detection computer system 112 also calculates 750 a distance of travel between the first merchant location and the cardholder home location.

Fraud detection computer system 112 also compares 760 a distance of travel between the first merchant location and the cardholder home location. Fraud detection computer system 112 also flags 770 the first financial transaction as potentially fraudulent upon determining that the calculated distance of travel exceeds the expected range of travel.

Figure 8:
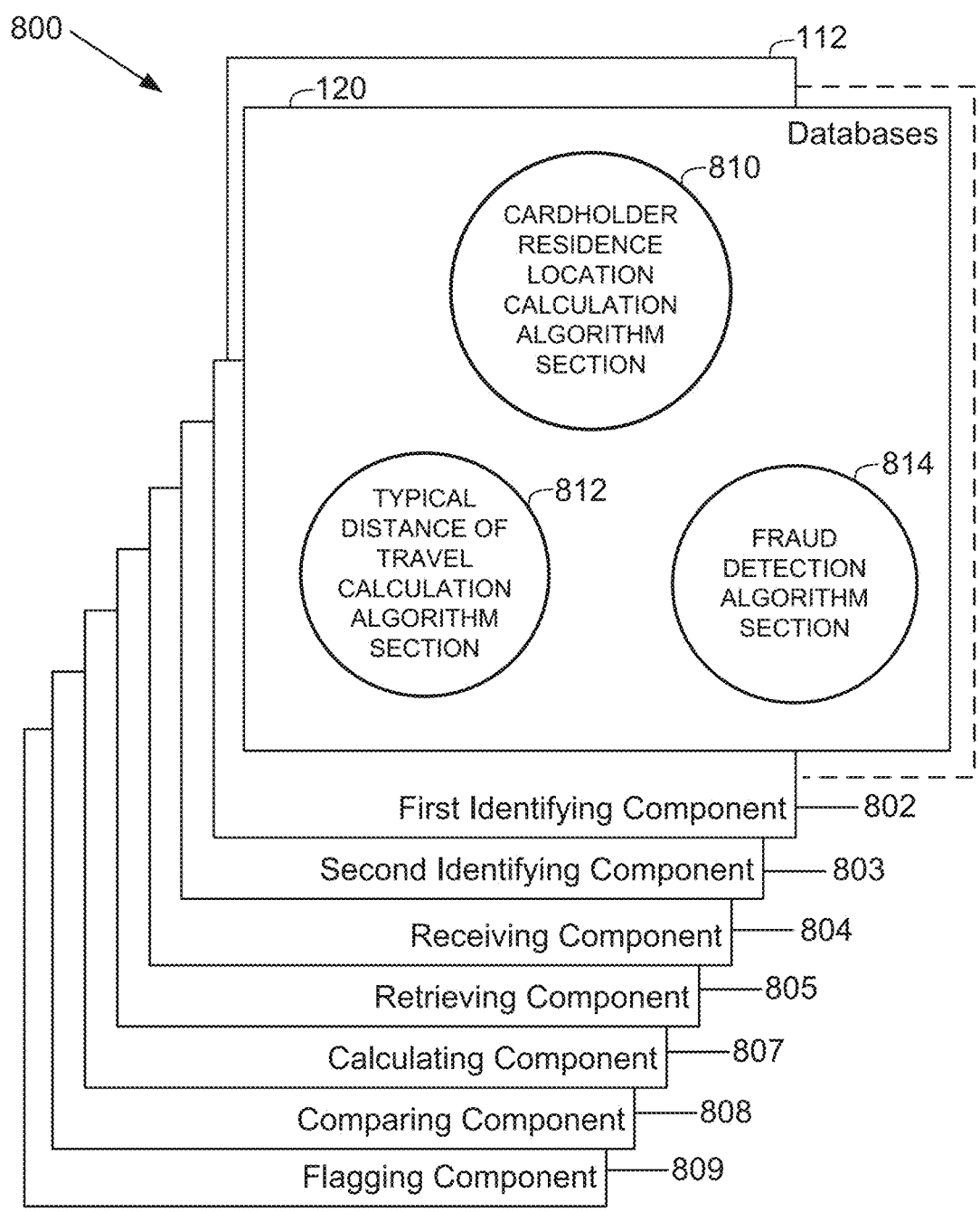

FIG. 8 is a diagram of components of one or more example computing devices that may be used in the environment shown in FIG. 5. FIG. 8 further shows a configuration of databases including at least database 120 (shown in FIG. 1). Database 120 is coupled to several separate components within fraud detection computer system 112, which perform specific tasks.

Fraud detection computer system 112 includes a first identifying component 802 for identifying a first home location for a first cardholder, the first home location based at least partially on historical transaction data associated with the first cardholder. Fraud detection computer system 112 also includes a second identifying component 803 for identifying an expected range of travel relative to the first home location for the first cardholder when making a typical financial transaction in at least one merchant category. Fraud detection computer system 112 additionally includes a receiving component 804 for receiving transaction data associated with a first financial transaction initiated by the first cardholder with a first merchant, the transaction data including merchant data and cardholder data, the first merchant being included within the at least one merchant category. Fraud detection computer system 112 also includes a retrieving component 805 for retrieving transaction data associated with a first financial transaction initiated by the first cardholder with a first merchant, the transaction data including merchant data and cardholder data, the first merchant being included within the at least one merchant category. Fraud detection computer system 112 additionally includes a calculating component 807 for calculating a distance of travel between the first merchant location and the cardholder home location. Fraud detection computer system 112 also includes a comparing component 808 for comparing a distance of travel between the first merchant location and the cardholder home location. Fraud detection computer system 112 includes a flagging component 809 for flagging the first financial transaction as potentially fraudulent upon determining that the calculated distance of travel exceeds the expected range of travel.

In an exemplary embodiment, database 120 is divided into a plurality of sections, including but not limited to, a cardholder home location calculation algorithm section 810, a typical distance of travel calculation algorithm section 812, and a fraud detection algorithm section 814. These sections within database 120 are interconnected to update and retrieve the information as required.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

This written description uses examples to disclose the disclosure, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for detecting potentially fraudulent cardholder transactions, the method implemented by a fraud detection computer system in communication with a memory, the fraud detection computer system in communication with a payment processor computer device in communication with a plurality of POS devices associated with a plurality of merchants, wherein the payment processor computer device is configured to process payment card transactions, the method comprising:

identifying a first geographic region associated with a first cardholder based on a first home location of the first cardholder;

for each merchant category of a plurality of merchant categories, identifying an expected range of travel relative to the first home location for the first cardholder when making a typical financial transaction in each merchant category based on the first geographic region;

for each expected range of travel for the plurality of merchant categories, determining a tolerance threshold for each expected range of travel, wherein the tolerance threshold is greater than zero, wherein the expected range of travel includes a first percentage of transactions in the merchant category, wherein the tolerance threshold plus the expected range of travel includes a second percentage of transactions in the merchant category, and wherein the second percentage is greater than the first percentage;

receiving, from the payment processing computer device, transaction data associated with a first financial transaction initiated by the first cardholder with a first merchant of the plurality of merchants, the transaction data including merchant data and cardholder data, the first merchant being included within a first merchant category of the plurality of merchant categories;

calculating, by the fraud detection computer system, a distance of travel for the first financial transaction between the first home location and a first merchant location of the first merchant of the first financial transaction based on the merchant data;

determining, by the fraud detection computer system, if the calculated distance of travel for the first financial transaction exceeds the expected range of travel plus the corresponding tolerance threshold for the first merchant category and the first geographic region; and
flagging the first financial transaction as potentially fraudulent upon determining that the calculated distance of travel for the first financial transaction exceeds the expected range of travel plus the corresponding tolerance threshold for the first merchant category and the first geographic region.

2. The method of claim 1 further comprising:
receiving, from the payment processing computer device, historical transaction data including a plurality of payment transactions associated with the first cardholder; and
identifying the first home location for the first cardholder, the first home location based at least partially on historical transaction data associated with the first cardholder.

3. The method of claim 2 wherein identifying the first home location further comprises identifying a plurality of home locations for each cardholder of a plurality of cardholders, the first home location included with the plurality of home locations.

4. The method of claim 3, wherein identifying an expected range of travel relative to the first home location further comprises determining the expected range of travel for each cardholder included within the plurality of cardholders for making a purchase at a merchant within a physical location.

5. The method of claim 1, wherein identifying an expected range of travel relative to the first home location further comprises:
receiving historical transaction data associated with a plurality of historical transactions, wherein the historical transaction data includes historical merchant data and historical cardholder data;
determining a historical merchant location based on the historical merchant data and the first home location based on the historical cardholder data for each of the historical transactions;
calculating a distance travelled between each historical merchant location and each first home location; and
determining a typical range of travel based on the plurality of calculated distances travelled for each historical transaction.

6. The method of claim 5, further comprising:
identifying a geographic region associated with each of the plurality of calculated distances travelled;
grouping the plurality of calculated distances travelled based on the identified geographic regions; and
determining a typical range of travel for each of the plurality of identified geographic regions based on the grouped calculated plurality of distances travelled.

7. The method of claim 5 further comprising:
calculating the first percentage as a percentage of the plurality of calculated distances traveled for the plurality of historical transactions; and
calculating the second percentage as a percentage of the plurality of calculated distances traveled for the plurality of historical transactions, wherein the second percentage includes more historical transactions than the first percentage.

8. The method of claim 1, further comprising:
identifying a plurality of typical ranges for each of a plurality of transaction categories;
identifying, based on the transaction data, a transaction category associated with the first financial transaction; and flagging the first financial transaction as potentially fraudulent upon determining that the calculated distance exceeds the typical range associated with the transaction category.

9. The method of claim 8, further comprising:
receiving a plurality of historical transaction data associated with a plurality of historical transactions, wherein each of the plurality of historical transaction data includes historical merchant data and historical cardholder data;
determining a historical merchant location and a cardholder home location for each of the plurality of historical transaction data;
determining a historical transaction category associated with each of the plurality of historical transaction data;
calculating a distance travelled between each historical merchant location and each cardholder home location; and
determining a typical range of travel for each transaction category based on the plurality of calculated distances travelled for each transaction category.

10. The method of claim 1, further comprising:
retrieving a profile associated with the first cardholder;
identifying whether the first cardholder has previously exceeded the expected range of travel based on the profile; and
authorizing the first financial transaction upon determining that the calculated distance exceeds the expected range of travel and also determining that the first cardholder previously exceeded the expected range of travel.

11. The method of claim 1, wherein determining if the calculated distance of travel for the first financial transaction exceeds the expected range of travel further comprises determining if the calculated distance of travel for the first financial transaction exceeds the expected range of travel for the first merchant category, the first geographic region, and a date of the first financial transaction, said method further comprising flagging the first financial transaction as potentially fraudulent upon determining that the calculated distance of travel for the first financial transaction exceeds the expected range of travel for the first merchant category, the first geographic region, and the date of the first financial transaction.

12. The method of claim 1 further comprising:
calculating a deviation of distance of travel where the calculated distance of travel for the first financial transaction exceeds the expected range of travel;
determining if the deviation of distance of travel exceeds the tolerance threshold;
if the determination is that the deviation of distance of travel exceeds the tolerance threshold, flagging the first financial transaction as potentially fraudulent; and
if the determination is that the deviation of distance of travel does not exceed the tolerance threshold, updating the expected range of travel.

13. A fraud detection computer system used to detect potentially fraudulent cardholder transactions, the fraud detection computer system in communication with a payment processor computer device in communication with a plurality of POS devices associated with a plurality of merchants, wherein the payment processor computer device is configured to process payment card transactions, the fraud detection computer system comprising:

a processor; and
a memory storing executable instructions that when executed by the processor, causes the processor to perform the steps of:
identify a first geographic region associated with a first cardholder based on a first home location of the first cardholder;
for each merchant category of a plurality of merchant categories, identify an expected range of travel relative to the first home location for the first cardholder when making a typical financial transaction in each merchant category based on the first geographic region;
for each expected range of travel for the plurality of merchant categories, determine a tolerance threshold for each expected range of travel, wherein the tolerance threshold is greater than zero, wherein the expected range of travel includes a first percentage of transactions in the merchant category, wherein the tolerance threshold plus the expected range of travel includes a second percentage of transactions in the merchant category, and wherein the second percentage is greater than the first percentage;
receive, from the payment processing computer device, transaction data associated with a first financial transaction initiated by the first cardholder with a first merchant of the plurality of merchants, the transaction data including merchant data and cardholder data, the first merchant being included within a first merchant category of the plurality of merchant categories;
calculate a distance of travel for the first financial transaction between the first home location and a first merchant location of the first merchant of the first financial transaction based on the merchant data;
determine if the calculated distance of travel for the first financial transaction exceeds the expected range of travel plus the corresponding tolerance threshold for the first merchant category and the first geographic region; and
flag the first financial transaction as potentially fraudulent upon determining that the calculated distance of travel for the first financial transaction exceeds the expected range of travel plus the corresponding tolerance threshold for the first merchant category and the first geographic region.

14. A fraud detection computer system in accordance with claim 13 wherein the memory stores additional executable instructions that when executed by the processor causes the processor to perform the steps of:
identify a plurality of home locations for each cardholder of a plurality of cardholders, the first home location included with the plurality of home locations; and
determine the expected range of travel for each cardholder included within the plurality of cardholders for making a purchase at a merchant within a physical location.

15. A fraud detection computer system in accordance with claim 13 wherein the memory stores additional executable instructions that when executed by the processor causes the processor to perform the steps of:
receive historical transaction data associated with a plurality of historical transactions, wherein the historical transaction data includes historical merchant data and historical cardholder data;
determine a historical merchant location based on the historical merchant data and the first home location based on the historical cardholder data for each of the historical transactions;
calculate a distance travelled between each historical merchant location and each first home location; and
determine a typical range of travel based on the plurality of calculated distances travelled for each historical transaction.

16. A fraud detection computer system in accordance with claim 15 wherein the memory stores additional executable instructions that when executed by the processor causes the processor to perform the steps of:
identify a geographic region associated with each of the plurality of calculated distances travelled;
group the plurality of calculated distances travelled based on the identified geographic regions; and
determine a typical range of travel for each of the plurality of identified geographic regions based on the grouped calculated plurality of distances travelled.

17. A fraud detection computer system in accordance with claim 13 wherein the processor is further configured to:
identify a plurality of typical ranges for each of a plurality of transaction categories;
identify, based on the transaction data, a transaction category associated with the first financial transaction; and
flag the first financial transaction as potentially fraudulent upon determining that the calculated distance exceeds the typical range associated with the transaction category.

18. A fraud detection computer system in accordance with claim 17 wherein the memory stores additional executable instructions that when executed by the processor causes the processor to perform the steps of:
receive a plurality of historical transaction data associated with a plurality of historical transactions, wherein each of the plurality of historical transaction data includes historical merchant data and historical cardholder data;
determine a historical merchant location and a cardholder home location for each of the plurality of historical transaction data;
determine a historical transaction category associated with each of the plurality of historical transaction data;
calculate a distance travelled between each historical merchant location and each cardholder home location; and
determine a typical range of travel for each transaction category based on the plurality of calculated distances travelled for each transaction category.

19. A fraud detection computer system in accordance with claim 13 wherein the memory stores additional executable instructions that when executed by the processor causes the processor to perform the steps of:
retrieve a profile associated with the first cardholder;
identify whether the first cardholder has previously exceeded the expected range of travel based on the profile; and
authorize the first financial transaction upon determining that the calculated distance exceeds the expected range of travel and also determining that the first cardholder previously exceeded the expected range of travel.

20. A non-transitory computer-readable storage media for detecting potentially fraudulent cardholder transactions, the computer-readable storage media having computer-executable instructions embodied thereon, wherein, when executed by at least one processor, the computer-executable instructions cause the processor to:
identify a first geographic region associated with a first cardholder based on a first home location of the first cardholder;

for each merchant category of a plurality of merchant categories, identify an expected range of travel relative to the first home location for the first cardholder when making a typical financial transaction in each merchant category based on the first geographic region;

for each expected range of travel for the plurality of merchant categories, determine a tolerance threshold for each expected range of travel, wherein the tolerance threshold is greater than zero, wherein the expected range of travel includes a first percentage of transactions in the merchant category, wherein the tolerance threshold plus the expected range of travel includes a second percentage of transactions in the merchant category, and wherein the second percentage is greater than the first percentage;

receive, from a payment processor computer device, transaction data associated with a first financial transaction initiated by the first cardholder with a first merchant of a plurality of merchants, the transaction data including merchant data and cardholder data, the first merchant being included within a first merchant category of the plurality of merchant categories, the payment processor computer device in communication with a plurality of POS devices associated with the plurality of merchants, wherein the payment processor computer device is configured to process payment card transactions;

calculate a distance of travel for the first financial transaction between the first home location and a first merchant location of the first merchant of the first financial transaction based on the merchant data;

determine if the calculated distance of travel for the first financial transaction exceeds the expected range of travel plus the corresponding tolerance threshold for the first merchant category and the first geographic region; and flag the first financial transaction as potentially fraudulent upon determining that the calculated distance of travel for the first financial transaction exceeds the expected range of travel plus the corresponding tolerance threshold for the first merchant category and the first geographic region.

\* \* \* \* \*